Sept. 7, 1943.    J. P. GALLAGHER    2,328,550
CUSHIONING DEVICE
Original Filed July 14, 1939

INVENTOR
JOHN P. GALLAGHER
BY
Warren S. Orton.
ATTORNEY

Patented Sept. 7, 1943

2,328,550

UNITED STATES PATENT OFFICE 2,328,550

CUSHIONING DEVICE

John P. Gallagher, Jersey City, N. J.

Original application July 14, 1939, Serial No. 284,386. Divided and this application August 19, 1940, Serial No. 353,236

8 Claims. (Cl. 267—9)

The invention relates to a cushioning device of general application for use in those situations where cushions and springs have heretofore been used, and the invention specifically relates to a cushion, shock absorber or similar motion retarding device designed to cushion, stop, retard or soften the movements of bodies, particularly bodies having large vertically directed momentum as in the case of the resilient mountings of railroad car bodies on their trucks, or, in the case of horizontally directed momentum, such as bumpers or the retarding elements of draft gears designed to cushion powerful impacts between adjacent cars. This application constitutes a division of my copending application Serial No. 284,386, filed July 14, 1939.

In its specific application to a bumper, snubber, draft gear or similar mechanism, particularly those designed to resist powerfully acting movements over short distances, the invention has for an object the providing of a simple form of cushioning device which will be free of the disadvantages inherent in the present known form of such devices which depend upon metal springs and will possess not only the advantages inherent in a rubber block, but will also utilize such block as a force translating device for actuating the friction shoes of a friction brake so that the complete structure will be a combination of rubber resistance and friction resistance to the actuating force to be cushioned.

Various other objects and advantages of the invention will be in part obvious from an inspection of the accompanying drawing and in part will be more fully set forth in the following particular description of one form of car mounting embodying the invention and the invention also consists in certain new and novel features of construction and combination of parts hereinafter set forth and claimed.

Figure 1:
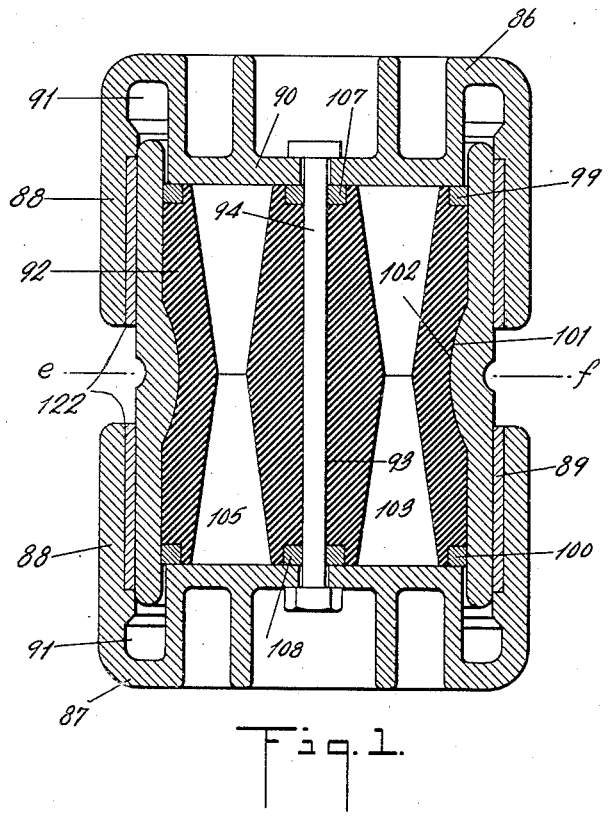
Figure 2:
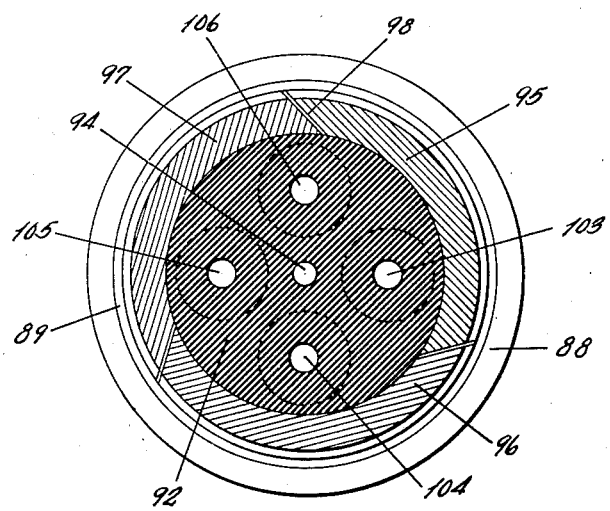

In the accompanying drawing:

Fig. 1 is a view in axial section of a preferred form of the invention featuring the use of a cored rubber block utilized in combination with friction shoes to provide a bumper, snubber, draft gear or other form of shock absorber; and Fig. 2 is a transverse sectional view taken on the line e—f of Fig. 1.

In the drawing there are disclosed two metallic heads 86 and 87 of identical construction and disposed in looking-glass symmetry on opposite sides of the medial plane e—f. Each head includes an outlining barrel-like projection 88 of cylindrical form, the inner face of which is on a raised wearing portion which provides a friction surface. The friction surface may be replaced when worn and for this purpose the raised portion is shown to be a sleeve 89 of wear resistant material. Each head is also provided centrally thereof with an inwardly extending boss 90 which forms between itself and the wall 88 an annular recess 91. Fitted between the bosses 90 of the two heads is a block or core 92 of rubber provided with a hole 93 extending axially therethrough. A tiebolt 94 is passed through the hole 93 and through the bosses 90 to limit the separating movement of the heads from each other as is common in draft gear and similar known snubber structures. The rubber block is surrounded completely by a sleeve forming structure which projects at opposite ends into the recesses 91 and has its ends spaced from the bottoms of the recesses a distance sufficient to provide for the requisite amount of approach permitted the heads under the circumstances surrounding the use to which the device is to be put. This sleeve is split to form a plurality, in this case shown to be three, friction shoes 95, 96 and 97, having their opposite ends in at least a light bearing engagement with the friction surfaces at 89. There is thus provided a frictional brake which resists the approach of the heads 86 and 87 with an intensity of engagement between the movable shoes and the fixed cylinder walls at least approximately proportionate to the forces which are causing the heads to approach each other. The adjacent edges of the shoes lap one another as shown at 98 to permit the desired freedom of relative movement between the shoes considered circularly as shown in Fig. 2 and at the same time to defeat any tendency of the rubber of the block to creep into the joints formed between the shoes. Split rings 99 and 100 are located at opposite ends of the rubber block in the corners provided by the bosses 90 and the ends of the shoes in order to prevent creeping of the rubber into the joints formed therebetween when the rubber block is subjected to the compressive forces which such devices are intended to cushion.

Each shoe is provided centrally thereof with an inwardly extending projection 101 fitted in a similarly shaped recess 102 formed in the adjacent cylindrical side of the rubber block adjacent its mid-waist portion. A plurality of core holes numbered 103—106 extend through the block and are arranged in concentric order about the axis of the assembly. Each of these core holes is of a double frustum, conical or hourglass form, and is of minimum cross sectional area adjacent its mid-length in the plane indicated by the line *e—f* and gradually increases in cross sectional area progressively towards its opposite ends. It is also suggested that restraining rings 107 and 108 be fitted into opposite ends of the block to encircle the bolt 94 and prevent seeping of the rubber out through the joints at these places.

In operation and assuming that the heads are caused to approach each other by the forces which are intended to be cushioned, the bosses 90 will act on the rubber block to distend the rubber outlining the holes 103—106 inwardly into the same. At the same time the compressive forces acting on the heads will be resolved into an outwardly directed component and this outward distention of the rubber will act to move the three shoes radially outward each into engagement with the friction surfaces provided by the cylinders 88 if these shoes are not already in engagement with their friction surfaces in the original set up of the assembly. In either case the shoes will be pressed into a firm bearing engagement with the friction surfaces provided by the two heads. This radially directed force will increase as the heads approach each other and until it reaches its maximum when the heads reach the limit of their desired travel. It follows then that any movement of the heads toward each other, even from the very beginning of their approaching movement and certainly after the frictional engagements have become effective, the shoes, which under these circumstances are held substantially fixed in space relative to the plane *e—f* will impose a frictional resistance to the approach of the heads 86—87 so that the heads are cushioned in their relative movement not only by the resistance to distortion or change of configuration inherent in the rubber block but this movement is also resisted by the accumulating frictional resistance between the shoes and the heads.

While this description assumes both heads to be moving, it is obviously possible to fix one head say the head 87 and move only the head 86. Considering the condition at any instant of time while the heads are approaching each other, it will be obvious that the force acting on the rubber block will be the force inherent at that time in the approaching heads. This is the force which resolved into two components acts on the block in two radial directions, one component acting to overcome the resistance offered by the rubber to being distorted and the other component acting to move the friction shoes into their squeezing position so that the squeeze pressure of the brake is a function of the force being resisted by the brake.

When the compressive forces which have been acting on the heads are released, the rubber block will restore itself to its original condition incidentally forcing the heads apart as far as is permitted by the tiebolt 94. At the same time, the radially outwardly directed forces acting upon the shoes have either been entirely released or at least relieved, depending upon whether or not the rubber block is at all times under distorting stresses to keep the shoes in their bearing engagement.

While the wear sleeve 89 may be mounted in place simply by means of a snug drum fit which will permit its removal and replacement when worn, it is suggested that the associated head be heated to effect the necessary expansion to permit the insertion of the sleeve so that, in cooling, the head will grip the sleeve 89 firmly in place. It is also suggested that the sleeve be locked in place in the head by welding the sleeve to the head as indicated at 122 in Fig. 1.

I claim

1. In a device of the class described, the combination of an outer member providing a friction surface on an inner face thereof, a plurality of friction shoes engaging said surface and at all times providing a continuous inner periphery, an expandable rubber core adapted in expanding to bear on said continuous surface and force the shoes into frictional engagement with the friction surface and provided with an empty internal cavity into which the rubber is free to distend when the outward expansion of the rubber is resisted by the shoes, and end members at all times engaging opposite ends of the rubber core and adapted to have relative movement towards each other to compress the rubber core therebetween and cause it to expand.

2. In a cushioning device, the combination of two heads having relative movement to and from each other, one of said heads provided with a friction surface extending in the direction of said relative movement, a block of rubber fitted between the heads in all positions thereof for resisting the relative approach of the heads, and provided with an internal cavity, a friction shoe carried by the block and adapted to engage said surface, said block having capacity to translate the compressive force acting thereon during the approach of the heads into a radially outwardly directed component for moving the shoe into operative engagement with said friction surface whereby the relative approach of said heads is resisted not only by the rubber block but also by the frictional resistance created between the shoe and the head provided with the friction surface.

3. In a cushioning device, the combination of a rubber core of tubular form at all times under compression, a sleeve completely surrounding the core forming a plurality of separate friction shoes, two pressure heads, one for each end of the core and each provided with an extension telescoping the adjacent ends of the shoes, said extensions providing on their inner faces friction surfaces engaged by the opposite ends of the shoes and means engaging the heads for limiting the extent of their movement away from each other and thus to insure the maintaining of the core under its initial compression.

4. In a friction absorbing device, opposed end followers having cylindrical walls presenting internal friction surfaces, overlapping shoes presenting continuous circumferential friction faces engaging said surfaces, a resilient member compressed between said shoes and said followers, and arcuate means on said shoes engaging a circumferential slot on said resilient member.

5. In a friction absorbing device, opposed end followers having friction walls presenting internal cylindrical surfaces, arcuate shoes presenting uninterrupted friction faces engaging said surfaces, a resilient member compressed between said shoes and said followers, and inter-engaging positioning means on said shoes and said resilient member.

6. In a friction absorbing device, end followers having housings presenting internal friction surfaces, overlapping friction shoes having arcuate faces engaging said surfaces, a resilient member compressed between said followers, and positioning means for said shoes comprising a transverse rib on said shoes engaging means on said resilient member.

7. In a friction absorbing device, and followers having housings presenting internal cylindrical friction surfaces, a plurality of shoes having arcuate friction faces engaging said surfaces, and a resilient member compressed between said shoes and said followers.

8. In a friction absorbing device, end followers having housings presenting internal cylindrical surfaces, laterally overlapping friction shoes presenting arcuate faces engaging said surfaces, and a resilient member abutting said shoes and said followers.

JOHN P. GALLAGHER.